Dec. 3, 1957 C. LEFF ET AL 2,815,106
ELECTROMAGNETIC FLUID MIXTURE CLUTCH
Filed Aug. 19, 1955
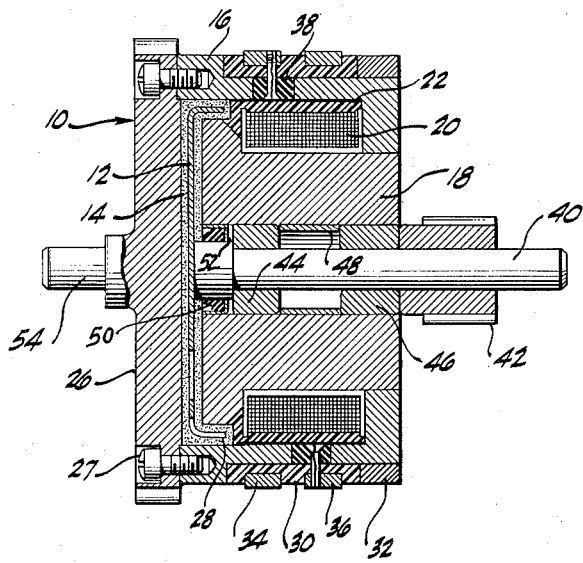
FIG. 1.
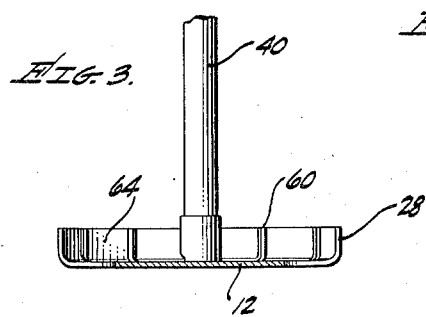
FIG. 3.
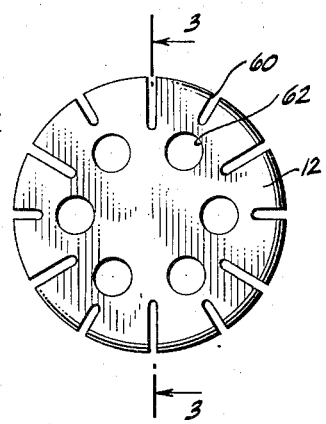
FIG. 2.
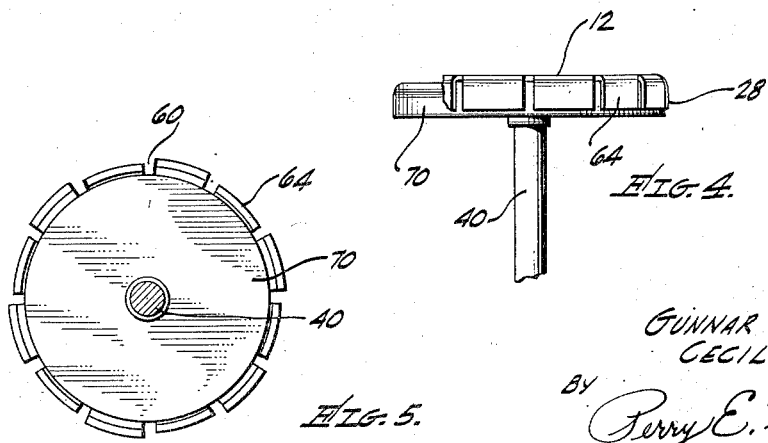
FIG. 4.
FIG. 5.
INVENTORS.
GUNNAR H. JANSON,
CECIL LEFF,
BY Perry E. Turner
AGENT.

United States Patent Office 2,815,106
Patented Dec. 3, 1957

2,815,106

ELECTROMAGNETIC FLUID MIXTURE CLUTCH

Cecil Leff, Los Angeles, Calif., and Gunnar H. Janson, Grand Rapids, Mich., assignors to Lear, Incorporated, Santa Monica, Calif.

Application August 19, 1955, Serial No. 529,422

2 Claims. (Cl. 192—21.5)

This invention relates to electromagnetic clutches, and more particularly to an improvement in the form and construction of the driven member for clutches of the type employing a mixture of magnetizable particles under the influence of a magnetic field to effect bonding of the driving and driven members.

In many so-called magnetic powder clutches, driven members are in the form of a notched cup having a circular flange. In all known applications, the driven cups are of substantially rigid construction, and all parts of the flange lie on the same circle. A mass of magnetizable particles is disposed in the region of the cup and driving member and, in the presence of a magnetic field, the cup and driving member are bonded by the particles and revolve as a unit. Since the disc portion of the cup is non-magnetic, the magnetic flux is concentrated through the flange and drive member. In the disengaged condition of the clutch, i. e., in the absence of magnetic flux, the mass of particles is idle. Openings in the disc portion of the cup and notches in the flange are provided to facilitate distribution of the powder to keep the inertia of the cup at a minimum, and to assist in bonding the driving and driven members. Where the cup is a rigid piece, a requirement to provide a clutch having desired torque characteristics may necessitate designing and forming a cup of the precise dimensions, even though a cup is available having only slightly different dimensions. It is apparent that such efforts and operations limit volume production of clutches.

It is an object of this invention to provide an improved clutch driven member for magnetic powder clutches.

It is another object of this invention to provide an improved form and construction of driven cups for magnetic powder clutches which will facilitate quantity production of clutches.

It is another object of this invention to provide, for magnetic powder clutches, a driven member having an adjustment feature to admit of its use to provide different torque characteristics.

The above and other objects and advantages of this invention will become apparent from the following description taken in conjunction with the accompanying drawings, in which a preferred embodiment of the invention is illustrated by way of example. The scope of the invention is pointed out in the appended claims. In the drawings, Fig. 1 is a cross section of a clutch employing an improved driven member in accordance with this invention, Fig. 2 is a side elevational view of the driven member employed in the clutch of Fig. 1, Fig. 3 is a sectional view taken along the line 3—3 of Fig. 2, and Figs. 4 and 5 are respective edge and side elevation views to illustrate the forming of a clutch driven member, further in accordance with this invention.

Briefly, the clutch driven member of this invention comprises a segmented flanged cup formed from a single blank and having a plurality of spaced slots which extend from its rim and terminate in the disc portion of the cup intermediate the flange and the center of the disc, and in which the segments of the flange do not lie on the same circle. The segments of the flange can be readily adjusted to meet torque requirements of the particular clutch in which the cup is employed.

Referring to Fig. 1, a magnetic powder clutch illustrating this invention comprises a driving member 10, a driven cup 12 and a mass of magnetizable particles, generally indicated at 14. Driving member 10 forms the clutch housing and comprises a body portion 16 of magnetic material. Body 16 provides the outer portion of a core assembly, the inner portion of which is a core 18 centrally located within body 16. The body and core are shaped to define an annular opening between them to receive an energizing winding or coil 20. An annulus 22 of non-magnetic material is provided intermediate coil 20 and body 16 to provide a non-magnetic barrier to aid in confining the flux to the vicinity of the coil and concentrating the flux in a narrow gap adjacent annulus 22 which separates the body 16 and core 18. The portions of body 16 and core 18 defining this gap constitute pole pieces. Such an arrangement is described and claimed in Patent No. 2,705,064, "Electromagnetic Fluid Mixture Clutch," W. P. Lear, et al., to which reference may be made for a complete explanation.

A clutch cover 26 is secured to one end of body 16, as by bolts 27, and cup 12 is positioned in the cavity defined in body 16, core 18 and cover 26, with its flange 28 located in the gap between the pole pieces. Cover 26 is provided with gear teeth about its periphery through which power can be applied from an external source, as by engagement with a pinion connected to a motor shaft (not shown).

Body 16 has a reduced diameter portion on which is placed an annulus 30 of electrically insulating or non-magnetic material, such as Bakelite, and a ring 32 in abutment with annulus 30 serves to hold the same in place. Annulus 30 supports spaced slip rings 34, 36, which may be partially embedded in the body thereof. An insulating element 38 is disposed in body 16 between slip ring 34 and coil 20; one end of coil 20 passes through openings in insulating element 38 and annulus 30 and is conductively connected to a slip ring 34. The other end of coil 20 is led through openings in a similar insulating element and annulus 30 for connection to the other slip ring 36. With this construction, brushes (not shown) may be placed in contact with the outer peripheral surfaces of the slip rings and coupled to an external source for applying energizing current to coil 20.

Cup 12 is secured to a shaft 40, as by brazing or projection welding. Shaft 40 extends through the center of core 18 to the exterior of the clutch housing, and a pinion 42 is fixed on the end of shaft 40 for rotation therewith. Alignment of shaft 40 is achieved by clutch bushings 44 and 46 and a bearing spacer 48 surrounding the shaft and registering with the inner wall of core 18.

The cavity in which the cup 12 is located is filled with a mass of paramagnetic material, which may be any suitable mixture such as the type described in the aforementioned patent. A conventional powder seal is provided by means of a rubber cup 50 supported in a metallic web 52 adjacent cup 12. Web 52 surrounds shaft 40 and bears against the inner wall of core 18, and rubber cup 52 is wedged between web 50 and shaft 40 adjacent cup 12.

It will be noted that gear cover 26 is provided with an integral shaft projection 54 which is coaxial with shaft 40. This construction permits both shafts 40, 54 to be rotatably supported to balance the clutch in operation.

A reading of the aforementioned patent will reveal details of operation of a clutch of the type above described, For the purpose of this description, it suffices to point out that driven member 10 is powered through a gear cover 26 from an external source. When coil 20 is not excited, the mass of particles 14 is idle and the clutch is in the disengaged condition, i. e., cup 12 does not rotate with driving member 10. When coil 20 is energized, the particles align themselves with the magnetic field to concentrate magnetic flux in the gap between the poles and to establish a firm bond between flange 28 and the body 16 and core 18. Cup 12 rotates with driving member 10 and drives shaft 40 and pinion 42. An output member (not shown) may be connected through gearing to pinion 42 for operation in the engaged condition of the clutch.

In accordance with this invention, cup 12 is a simple one-piece element of magnetizable material. A plurality of spaced slots 60 are provided in flange 28, each extending along the length of the flange and terminating in the disc portion intermediate the flange and the axis of the cup (see Figs. 2 and 3). Slots of such length serve to reduce the superficial area of the drive member and, during idling, minimize undesirable rubbing friction between the cup and the powder. The disc portion of the cup is also provided with apertures 62 for the same purpose.

The cup construction above described provides a flange having a plurality of segments or tongues 64 capable of being selectively positioned in assembly to effect a desired bonding by the powder, and hence desired pull-in and running torque. How this is accomplished will now be explained with reference to Figs. 4 and 5.

Cup 12 can be easily formed, as by a single stamping operation, to provide a plate or disc having the required number of slots and apertures mentioned above. The plate is then secured to the shaft 40, and a forming die 70 placed over the shaft and in abutment with the plate. Die 70 preferably is an element which can be readily machined and has good shape-retaining qualities; typical is a hardened tool steel, although other suitable materials may be used.

Preferably the metal employed for the cup is soft enough to permit the flange to be formed readily to a desired shape. To form the flange, the tongues are bent over the edge and against the circular periphery of die 70. Die 70 may be dimensioned so that the placing of all the tongues against its periphery provides a flange which would fit substantially in the center of the annular gap between the pole pieces. Next, depending upon the torque requirements, and to compensate for variables explained hereafter, individual tongues are selectively spaced from the periphery of blank 70, as by means of feeler gauges inserted between a tongue and the blank. After removing the die and assembling the cup in the clutch, such tongues will be nearer the outer pole.

It has been found that where a tongue is positioned nearer one pole than the other, the total bonding effect between the poles and the adjacent surfaces of the tongue is greater than where the tongue is located midway between the poles. One or more of the tongues may be positioned nearer the outer pole as above described to realize a greater torque. If two or more of the tongues are thus spaced, they may be successive or adjacent tongues, or they may be alternate ones. The tongues positioned in this manner will be located nearer the outer one of the two pole pieces and each will contribute to greater torque.

It will be apparent from the foregoing that all the tongues initially may be positioned on the same circle nearer the inner or the outer pole, and selective tongues adjusted to lie off the circle. If all the tongues are initially located nearer the inner pole, positioning of an individual tongue between its initial position and a point midway between the poles effects a decrease in torque; further spacing of the tongue to position it between the midway point and the outer pole will effect an increase in torque. For the reverse situation where all the tongues are initially positioned nearer the outer pole and individual tongues are moved to inner positions, it will also be apparent that positioning of a tongue intermediate the poles effects a decrease in torque, and that a greater contribution to overall torque is obtained when a tongue is positioned adjacent the inner pole than at a point midway between the poles.

A desired arrangement in accordance with this invention is to stagger the tongues about a mean circumferential line midway between the poles (see Fig. 5). In this situation, the further positioning of any tongue at a point between its initial position and the mean circumference will effect less torque than in its initial position. If one of the innermost tongues is moved to a corresponding position nearer the outer pole, an overall increase in torque will be realized; further, the tongues nearer the outer pole contribute more to the pull-in and running torque than do those nearer the inner pole. This may be understood by observing that the areas of the outer pole surface exposed to the outermost tongues are larger than the areas of the inner pole surface exposed to the innermost tongues.

A further advantage of the adjustment feature of the clutch driven member of this invention is the characteristic by which, from stampings of the same size, cups can readily be dimensioned in assembly for clutches having different torque characteristics. Further, the same adjustment features can be used to advantage to provide clutches having substantially uniform characteristics.

It is well known that in quantity production of clutches of the same design, several variables closely associated with the assembly of parts will influence the operation of completed clutches. Among these are such factors as (a) dimensional variations in metal parts, such as the body 16 and core 18, and their effects on the magnetic path through them and the dimensions of the air gap, (b) tolerances of the magnetic powder which vary from mixture to mixture, (c) bearing friction, (d) friction torque as affected by friction at the seals, and (e) variations in permeability of the metal parts as affected by non-uniform annealing in their formation. When the parts are assembled and it is found that the operating characteristics of the clutch are outside design tolerances, it is a simple matter to reposition one or more of the tongues forming the cup flange to achieve a torque characteristic well within the allowable limits. In other words, the cup construction of this invention permits shaping of the flange to compensate for the effects of many variables which otherwise might necessitate rejecting a clutch for a particular application. Thus, it can be seen that quantity production of clutches having substantially uniform torque characteristics is facilitated by the driven cup of this invention.

It should be pointed out that a cup having slots as herein described is by no means limited to a one-piece cup. It is considered within the scope of this invention to slot a two-piece cup in similar fashion to provide selectively adjustable means to obtain desired torque characteristics for a clutch.

What is claimed is:

1. An electromagnetic clutch having a rotatable driving member including a pair of annular poles disposed to define an annular gap, electrical means to provide magnetic flux through said gap upon energization of the clutch, a rotatable driven member having an annular part positioned in said gap, said annular part extending from a main body portion, a casing carried by said driving member for enclosing said gap and driven member, a mass of magnetic particles disposed about said driven member, said particles being adapted upon energization of the clutch to unite said driven member and said driving member for joint rotation, said annular part having a plurality of spaced slots extending the length thereof and into said main body portion to define a plurality of spaced tongues, and selected ones of said tongues being located in said gap on a different circle than the other tongues, each tongue being characterized upon energization of the clutch by a bonding effect between the surfaces thereof and said poles which depends upon the position thereof, and all of said tongues providing predetermined torque characteristics for the clutch upon establishment of joint rotation of said driving and driven members.

2. An electromagnetic clutch having a rotatable driving member including a pair of annular poles disposed to define an annular gap, electrical means to provide magnetic flux through said gap upon energization of the clutch, a rotatable driven member having an annular part positioned in said gap, said annular part extending from a main body portion, a casing carried by said driving member for enclosing said gap and driven member, a mass of magnetic particles disposed about said driven member, said particles being adapted upon energization of the clutch to unite said driven member and said driving member for joint rotation, said annular part having a plurality of spaced slots extending the length thereof and into said main body portion to define a plurality of spaced tongues, and said tongues being staggered on both sides of a mean circumference of said gap.

References Cited in the file of this patent

UNITED STATES PATENTS

| | | |
|---|---|---|
| 2,654,454 | Turkish | Oct. 6, 1953 |
| 2,712,371 | Duncan | July 5, 1955 |
| 2,772,761 | Janson | Dec. 4, 1956 |

OTHER REFERENCES

Magnetic Powder Clutch Servo—Radio and Television News, vol. 44, issue 3. September 1950.